(12) United States Patent
Fromentin

(10) Patent No.: US 9,098,081 B2
(45) Date of Patent: Aug. 4, 2015

(54) METHOD FOR OPTIMIZING THE WORKING CONDITIONS OF A CUTTING TOOL

(75) Inventor: Guillaume Fromentin, Cluny (FR)

(73) Assignee: ARTS, Paris (FR)

( * ) Notice: Subject to any disclaimer, the term of this patent is extended or adjusted under 35 U.S.C. 154(b) by 491 days.

(21) Appl. No.: 13/514,949

(22) PCT Filed: Dec. 8, 2010

(86) PCT No.: PCT/EP2010/007466
§ 371 (c)(1),
(2), (4) Date: Aug. 1, 2012

(87) PCT Pub. No.: WO2011/069646
PCT Pub. Date: Jun. 16, 2011

(65) Prior Publication Data
US 2013/0178973 A1    Jul. 11, 2013

(30) Foreign Application Priority Data

Dec. 8, 2009   (FR) ..................................... 09 05926

(51) Int. Cl.
| | |
|---|---|
| G06F 19/00 | (2011.01) |
| G05B 19/416 | (2006.01) |
| G05B 19/401 | (2006.01) |

(52) U.S. Cl.
CPC .......... *G05B 19/4163* (2013.01); *G05B 19/401* (2013.01); *G05B 2219/49092* (2013.01)

(58) Field of Classification Search
USPC ............................ 700/173; 428/698; 318/571
See application file for complete search history.

(56) References Cited

U.S. PATENT DOCUMENTS

| | | | | |
|---|---|---|---|---|
| 4,408,280 | A * | 10/1983 | Bedini et al. .................. | 700/173 |
| 5,184,053 | A * | 2/1993 | Maruo et al. .................. | 318/571 |
| 5,815,400 | A * | 9/1998 | Hirai et al. ..................... | 700/173 |
| 6,694,213 | B2 * | 2/2004 | Claesson et al. .............. | 700/169 |
| 2004/0018393 | A1 * | 1/2004 | Fukui et al. .................... | 428/698 |

(Continued)

OTHER PUBLICATIONS

Vaez-Zadeh et al., "A continuous efficiency optimization controller for induction motor drives," Energy Conversion and Management, vol. 46, No. 5, Mar. 1, 2005, pp. 701-713.

Jantunen, "A summary of methods applied to tool condition monitoring in drilling, International Journal of Machine Tools and Manufacture," vol. 42, No. 9, Jul. 2002, pp. 997-1010.

(Continued)

*Primary Examiner* — Robert Fennema
*Assistant Examiner* — Anthony Whittington
(74) *Attorney, Agent, or Firm* — Muncy, Geissler, Olds & Lowe, P.C.

(57) ABSTRACT

The invention relates to a method for acquiring the optimized parameters of a machining operation in the application of COM methodology, comprising: providing a plurality of readings indicative of the specific cutting energy (Kc) during an equal plurality of tests carried out with an imposed value, that is different from one test to another by at least one variable representative of the cutting operations, one of said variables being the cutting speed (Vc) and another being the advance rate (f); next determining a range of values of each of said variables including the optimal value for said variable obtained by means of processing the results for carrying out the machining operation; characterized in that a specific program (10a) of the digital control (7) is used for obtaining a continuous variation of the values of the variable during a single machining pass for a test, and in that the data read are formed during said single pass by the different values of the torque current (Iq) of the motor of the machine pin from which the corresponding values of (Kc) are derived by means of computational processing.

4 Claims, 2 Drawing Sheets

(56) References Cited

U.S. PATENT DOCUMENTS

| | | | |
|---|---|---|---|
| 2006/0212159 A1* | 9/2006 | Battistella et al. | 700/175 |
| 2007/0046238 A1* | 3/2007 | Xu | 318/571 |
| 2009/0049953 A1* | 2/2009 | Shindo et al. | 75/238 |
| 2009/0198369 A1* | 8/2009 | Xu et al. | 700/173 |
| 2010/0014930 A1* | 1/2010 | Taniuchi et al. | 407/66 |
| 2010/0215951 A1* | 8/2010 | Shibata et al. | 428/336 |

OTHER PUBLICATIONS

Li, "Development of Current Sensor for Cutting Force Measurement in Turning," IEEE Transactions on Instrumentation and Measurement, vol. 54, No. 1, Feb. 1, 2005, pp. 289-296.

Kliman et al., "Sensorless, Online Motor Diagnostics," IEEE Computer Applications in Power, vol. 10, No. 2, Apr. 1, 1997, pp. 39-43.

* cited by examiner

METHOD FOR OPTIMIZING THE WORKING CONDITIONS OF A CUTTING TOOL

BACKGROUND OF THE INVENTION

1. Field of the Invention

The present invention relates to a method for optimizing the working conditions of a cutting tool in the shaping of parts by the removal of chips, primarily turning, milling and drilling.

2. Brief Discussion of the Related Art

The aim of the French standard NF E66-520 is to define a method called Tool/Workpiece Combination (COM) intended to determine the working conditions of a cutting tool so as to deduce therefrom an optimum range of use in production. In practice, as recalled in the introduction to that standard: "These days, it is essential to get it right straight away while improving and predimensioning the production system."

Following the method recommended by this standard is a practice that has become fairly widespread these days. Very schematically, it will be recalled that the standard stipulates carrying out tests, after having defined a stable operating point for the tool and for the machine (qualification point), by varying, independently of one another, about this operating point, at least two parameters which will be, for example, the cutting speed Vc and the advance f of the tool. The recordings made during these tests make it possible to determine the variation of the energy consumed by the machining operation as a function of the variable Vc and f, which energy is called specific cutting energy or effort Kc (for the case of turning). The minimum values of this energy make it possible to determine a range between maximum and minimum values of the parameters Vc and f, within which ranges the machining operation is optimized. It is possible to refine these operations according to the standard by applying various correlations of the optimum data with other criteria such as monitoring the chips produced and the surface condition obtained.

The normative methodology requires a number of tests to be carried out for the results to have a statistical value in producing the curves (or databases) which will be used in choosing the optimum operating conditions of the tool. Implementing these tests presents two drawbacks: the requirement to instrument the machine and the tool that is to be "predimensioned" for series production and the expenditure of time needed to carry out the tests for determining optimal operation.

There is therefore a need to simplify the COM methodology by eliminating the instrumentation of a machine and by saving time in the recording of the parameters that are used for this methodology.

SUMMARY OF THE INVENTION

Thus, the subject of the invention is a method for acquiring the optimized parameters of a machining operation by means of a numerically-controlled machine by the removal of material on a part using a cutting tool, the machine being provided with a motor-driven spindle for driving either the part (turning) or the tool (milling or drilling), in application of the COM methodology:

whereby a plurality of readings of a datum representative of the specific cutting energy (Kc) are taken during an equal plurality of tests carried out with an imposed value, different from one test to another, of at least one significant variable of the cutting operations, in which one of the variables concerned is the cutting speed (Vc) and another of these variables is the feed rate (f), whereby there is then determined, by processing conforming to the norm of the imposed variables and of the recorded data, a range of values of each of these variables which will contain the optimum value of this variable obtained by processing of the results for carrying out the machining operation, characterized in that, for each variable, the imposed values and their trend result from a specific program (10a) of the numerical control (7) imposing a continuous variation of said values of the variable during a single machining pass as a test and in that the recorded data are compiled during this single pass, from the different values taken by the torque current (Iq) of the motor of the spindle of the machine from which the corresponding values of (Kc) are derived by computational processing.

One of the significant advantages of the invention lies in the fact that the tool/workpiece combination of a machining operation by the removal of chips is obtained directly on the production machine. There is no longer a need to instrument such a machine and to immobilize it to carry out the series of tests stipulated by the standard. The time saving is then considerable and is accompanied by a saving of costly equipment which is often not suited to use in a workshop—hence the need for a construction in a protected space of an instrumented machine dedicated to the tests, which is not negligible in terms of investment—and by a reduction in the number of the test parts which are unsuitable for marketing, and which may have a not inconsiderable impact on small-scale production runs.

The invention is reflected in a particular programming introduced into the numerical control of the machine which makes it possible, on the one hand, to continuously vary the variables Vc and f and, on the other hand, to process the data by computation according to known formulae to deduce therefrom the values useful to the COM methodology and by way of a human-machine interface which allows for the display (graphical for example) of the results useful to the setting of the machine after the two test passes to launch the series production.

Moreover, during a production cycle, it may be possible, via the appropriate programming according to the invention of the numerical control of the machine, to proceed with the extraction of the imposed and acquired values which characterizes a machining pass during production.

Other features and advantages of the invention will emerge from the description given below of an exemplary embodiment of the invention.

BRIEF DESCRIPTION OF THE DRAWINGS

Reference will be made to the appended drawings in which:

FIGS. 1 and 2 illustrate, by graphs of the specific cutting energy as a function of the cutting speed (Vc) and feed (f) variables, the validation of the data obtained by the invention by comparison with the data obtained by known methods.

DETAILED DESCRIPTION OF THE PREFERRED EMBODIMENTS

Figure 1:
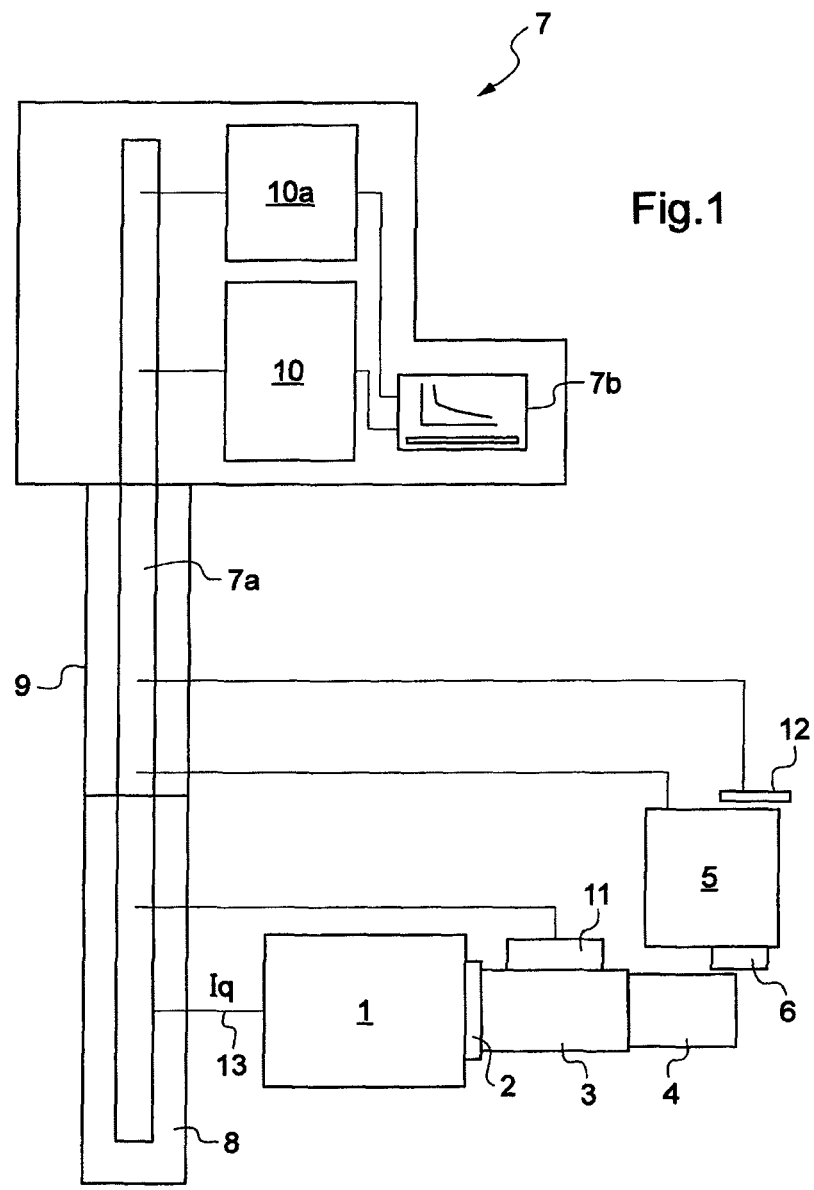
FIG. 1 illustrates, by a diagram, a turning machine in which the method of the invention is implemented.

The diagram of FIG. 1 is that of a numerically-controlled machine intended for turning operations. To this end, a gear motor 1 is coupled by a transmission 2 to a spindle 3 which rotationally drives the parts to be machined 4. Moreover, the machine comprises a carriage 5, which can be displaced by a motor along a direction substantially parallel to the axis of the part to be turned, this carriage bearing a cutting tool 6 for machining the part 4.

The numerical control 7 is a programmable computer unit which acts on a regulator 8 of the power supply for the gear motor and on a regulator 9 of the motor driving the carriage 5, and does so according to machining software or a machining program 10. A communication bus 7a links the regulators to the numerical control and the latter to sensors 11 (coder) registering the rotation of the spindle, 12, of the displacement of the carriage. The regulator 8 computes, at each instant, the value of the torque current (Iq) of the spindle motors and enables the numerical control to know this value at each instant.

According to the invention, the numerical control has complementary software 10a which makes it possible to program the execution of a machining pass during which the variable test parameters that are those listed by the COM standard, that is to say, primarily, the cutting speed (Vc) and the feed (f), take continuously variable values. This software may also include the possibility of programming machining passes prior to the test passes in order, for example, to determine a qualification point within the meaning of the standard.

The execution of the test program will comprise a first machining pass during which the cutting speed (Vc) is varied, for example from 120 to 380 meters per minute, whereas the feed (f) is fixed, for example at the qualification value. The torque current (Iq) delivered by the regulator 8 of the motor 1 to the numerical control is read and recorded continuously.

From this datum, the test program is able to work out the specific energy (Kc) corresponding to each value of (Vc).

Figure 2:
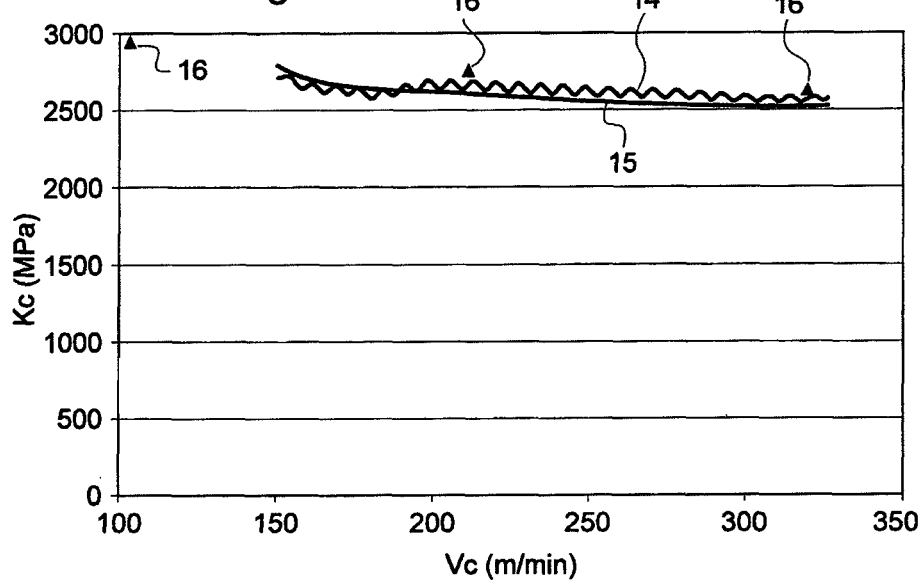

The result thereof is a curve such as that 14 of FIG. 2, the latter having been filtered. It will be observed that this curve is perfectly correlated with the curve 15, obtained with a piezoelectric dynamometer, of measurements of (Kc) and the discrete measurements 16 obtained from the conventional method also using a piezoelectric dynamometer. In this range of values, it will then be possible to determine the cutting speed (Vc) that is most appropriate to a minimum value of (Kc), and therefore to optimize the machining in relation to this first criterion which is the cutting speed (Vc).

Figure 3:
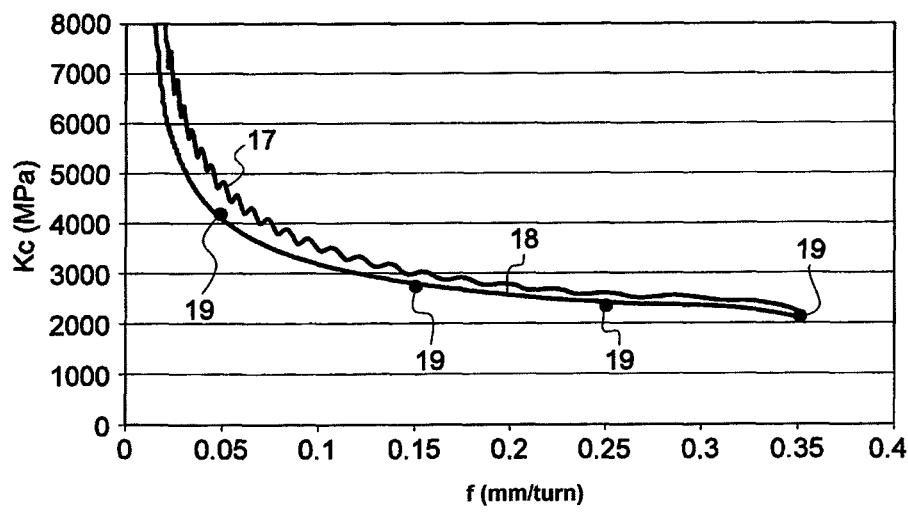

The second test machining pass consists in varying the feed (f) within a range determined, for example, between, in the case of a turning operation, a few hundredths of millimeters and 3.5 tenths of millimeters per turn. The reading and the recording of the torque current (Iq) makes it possible to obtain the curve 17 of FIG. 3, the value of (Kc) having resulted from a processing of (Iq).

It will be observed, as previously, that this curve is indicative of the variation of the value sought since it runs close to the points read by other conventional measuring means (a piezoelectric dynamometer) such as the points 18 or is very close to the curve 19 which are the continuous recording of the results of tests carried out with these conventional means. The choice of the advance value for optimized execution of the machining is thus immediate.

It will be understood that the invention, by continuously varying a cutting parameter during a single machining pass, makes it possible to acquire the data necessary to the application of the COM standard while avoiding the need to instrument a machine for this purpose and to proceed with numerous tests.

The relevance of this software solution is great in that it can be installed on each production machine and operate in a workshop environment which usually does not lend itself to the execution of accurate measurements.

The machine or its numerical control unit comprises, as is known, a human-machine interface such as a display screen 7b. This interface constitutes the means for displaying, either numerically or graphically, the value to be chosen to optimize the machining operation. This interface may also comprise an access means for the operator in order to validate a value proposed by the machine or to enter a value of his or her choice, that he or she will have considered to be more relevant.

The invention claimed is:

1. A method for acquiring the optimized parameters of a machining operation by means of a numerically-controlled machine by the removal of material on a part using a cutting tool, the machine being provided with a motor-driven spindle for driving either the part or the tool, in application of the COM methodology:

whereby a plurality of readings of a datum representative of the specific cutting energy (Kc) are taken during an equal plurality of tests carried out with an imposed value, different from one test to another, of at least one significant variable of the cutting operations, in which one of the variables concerned is the cutting speed (Vc) and another of these variables is the feed rate (f), wherein, by processing conforming to the norm of the imposed variables and of the recorded data, it is determined a range of values of each of these variables which will contain the optimum value of this variable obtained by processing of the results for carrying out the machining operation, wherein, for each variable, the imposed values and their trend result from a specific program of the numerical control imposing a continuous variation of said values of the variable during a single machining pass as a test and in that the recorded data are compiled during this single pass, from the different values taken by the torque current (Iq) of the motor of the spindle of the machine from which the corresponding values of the specific cutting energy (Kc) are derived by computational processing.

2. The numerically-controlled machine for implementing the method as claimed in claim 1, wherein the numerical control comprises specific software for determining, by means of the torque current (Iq) of the spindle, the optimum values of the advance and of the cutting speed of the tool.

3. The machine as claimed in claim 2, in which the numerical control has a human-machine interface, wherein this interface constitutes the means for displaying and inputting the optimized values of the cutting speed and of the advance to be chosen for the programmed machining operation.

4. The method as claimed in claim 1, wherein the removal of material is accomplished by at least one of milling, turning, and machining.

* * * * *